United States Patent
Hecker

(10) Patent No.: US 7,123,694 B1
(45) Date of Patent: Oct. 17, 2006

(54) METHOD AND SYSTEM FOR AUTOMATICALLY TRANSLATING MESSAGES IN A COMMUNICATION SYSTEM

(75) Inventor: Hans-Dieter Hecker, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,055

(22) PCT Filed: Sep. 7, 1998

(86) PCT No.: PCT/DE98/02624

§ 371 (c)(1),
(2), (4) Date: Mar. 20, 2000

(87) PCT Pub. No.: WO99/16257

PCT Pub. Date: Apr. 1, 1999

(30) Foreign Application Priority Data

Sep. 19, 1997 (DE) ................. 197 41 475

(51) Int. Cl.
*H04M 1/64* (2006.01)
(52) U.S. Cl. ............... 379/88.05; 379/142.15; 704/3
(58) Field of Classification Search .......... 379/88.05, 379/88.06, 142.15, 88.19, 88.21, 196, 197, 379/198; 704/3, 4, 9
See application file for complete search history.

(56) References Cited

U.S. PATENT DOCUMENTS

| | | | | |
|---|---|---|---|---|
| 5,528,491 A | * | 6/1996 | Kuno et al. ................. 704/9 |
| 5,546,304 A | * | 8/1996 | Marschner et al. ............ 704/4 |
| 5,675,817 A | * | 10/1997 | Moughanni et al. ........... 704/3 |
| 5,870,454 A | * | 2/1999 | Dahlen ..................... 379/88.14 |
| 5,875,422 A | * | 2/1999 | Eslambolchi et al. .......... 704/3 |
| 5,940,806 A | * | 8/1999 | Danial ...................... 705/26 |
| 6,069,939 A | * | 5/2000 | Fung et al. .............. 379/88.05 |
| 6,240,170 B1 | * | 5/2001 | Shaffer et al. ......... 379/142.15 |
| 6,292,769 B1 | * | 9/2001 | Flanagan et al. .............. 704/3 |

FOREIGN PATENT DOCUMENTS

| | | |
|---|---|---|
| EP | 0 311 416 | 4/1989 |
| EP | 311416 A2 * | 4/1989 |
| EP | 0 357 370 | 3/1990 |
| EP | 0 585 480 A1 | 3/1994 |
| EP | 0 601 710 A2 | 6/1994 |
| EP | 601710 A2 * | 6/1994 |
| WO | WO 95/20859 | 8/1995 |

OTHER PUBLICATIONS

ISDN im Buro HICOM pp. 58-67.

* cited by examiner

*Primary Examiner*—Gerald Gauthier
(74) *Attorney, Agent, or Firm*—Bell, Boyd & Lloyd LLC

(57) ABSTRACT

A method and system for automatically translating messages in a communication system wherein, when a connection is set up between a calling terminal device and a called terminal device, a first item of selector information identifying a language that depends on a calling subscriber is compared to a second item of selector information identifying a language that depends on a called subscriber. If the items of selector information do not match, a translator is looped into the connection automatically.

8 Claims, 2 Drawing Sheets

Figure 1:
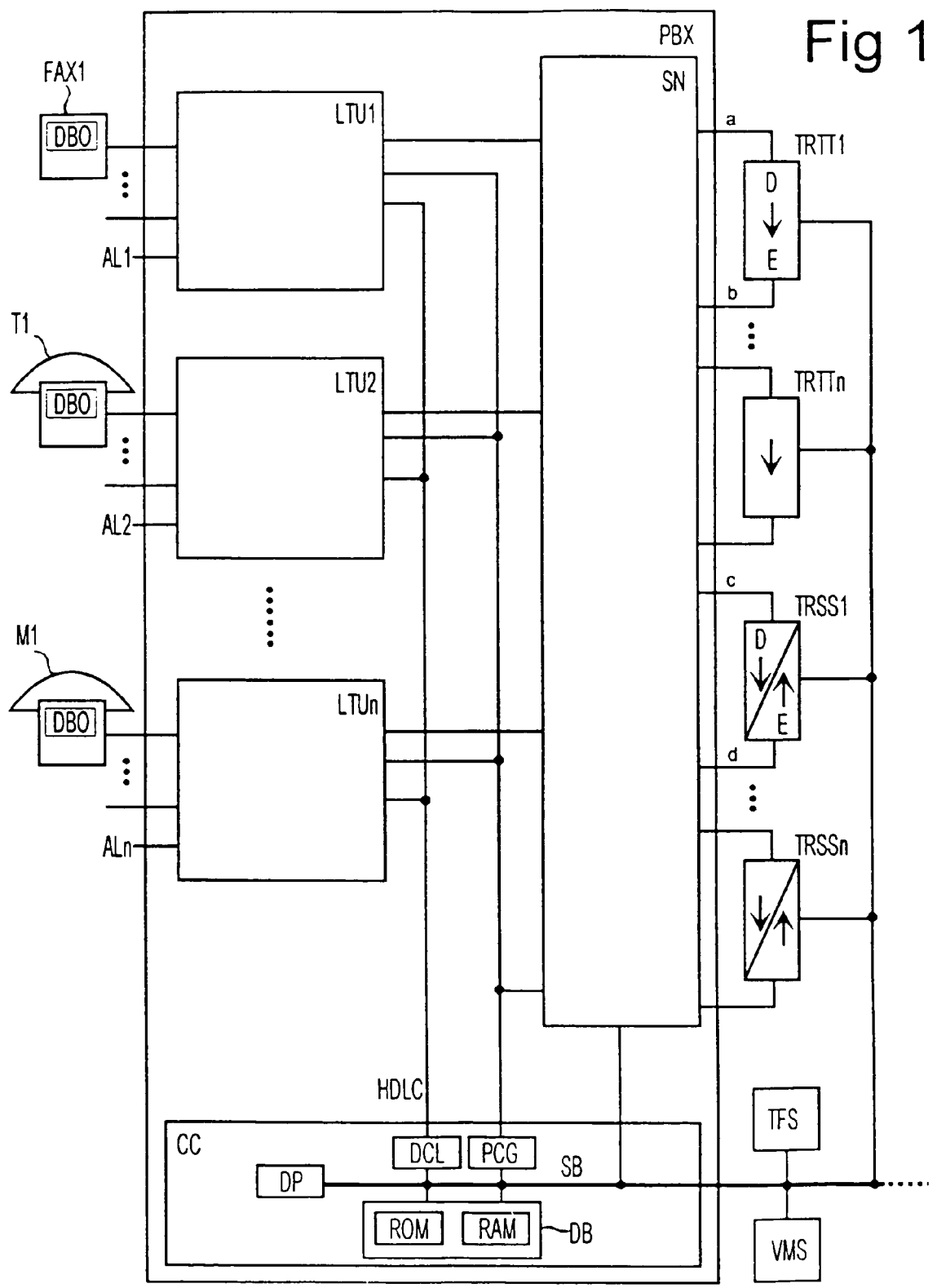

METHOD AND SYSTEM FOR AUTOMATICALLY TRANSLATING MESSAGES IN A COMMUNICATION SYSTEM

BACKGROUND OF THE INVENTION

1. Field of the Invention

The present invention relates to a method and system in a communication system for translating messages in the most convenient manner possible, wherein the messages are directed to a called subscriber and are translated into a language that is dependent upon the called subscriber.

2. Description of the Prior Art

The Siemens product guide "ISDN in the Office" (special edition telecom report and Siemens Magazine COM; ISBN 3-8009-3849-9, pp 58–66) teaches a private communication system that makes additional functions available, besides switching-related functions. Such additional functions are generally referred to as performance features; A large number of different performance features are known for the communication service "voice".

With the increasing internationalization of telephone traffic, the number of connections between telephone subscribers who speak different languages is growing. In the course of this development, it is known that efforts have been made to facilitate understanding between telephone subscribers who speak different languages by inserting a translating device.

EP 0 585 480 A1 teaches a method in which translation device are respectively looped in between two subscriber terminal devices which are participating in a conference connection, To loop in a translation device, it is necessary to input additional information into one or more subscriber terminal devices participating in the conference connection.

The information that triggers the loop-in of the translation device is inputted upon request either by selecting a call number at the respective subscriber terminal device or by voice sampling in the language in which the respective conference subscriber wants to conduct the subsequent conversation in the context of the conference connection; that is, wants to speak and hear.

It is an object of the present invention to set forth a method and system which affords a higher level of convenience in a connection between subscribers of such different native languages.

SUMMARY OF THE INVENTION

Accordingly, with an eye toward the advantage that a subscriber can communicate in his native language without additionally inputting information, the present invention provides a method in a communication system for translating messages that are directed to a called subscriber into a language that is dependent upon the called subscriber, wherein the method includes the steps of: storing selector information designating a language that is allocated to the relevant subscriber for internal subscribers in the communication system; comparing the selector information of the calling subscriber, when a connection is set up, to the selector information of the called subscriber; and automatically activating a loop-in function, when the items of selector information differ, which effects an insertion of a translator into the connection.

In an embodiment, the method further includes the step of storing, in the communication system, display texts for a dialog operator interface of internal terminal devices in several languages.

In an embodiment, the method further includes the step of forming the selector information dependent on the language of the display texts for the dialog operator interface that is selected by a subscriber.

In an embodiment, the method further includes the step of transmitting, in cases when a calling terminal device and a called terminal device are allocated to different communication systems, the selector information from the communication system of the calling terminal device to that of the called terminal device.

In an embodiment, the method further includes the step of transmitting the selector information in the framework of a call signaling, particularly of an ISDN call signaling.

In an embodiment, the method further includes the step of transmitting, in cases when a calling terminal device and a called terminal device are allocated to different communication systems, the selector information from the communication system of the called terminal device to that of the calling terminal device.

In an embodiment, the method further includes the step of deactivating the loop-in function.

In an embodiment of the method, the message to be translated is either a voice message, a fax message, a video message or a message for electronic mail.

In a further embodiment of the present invention, a system is provided in a communication system for translating messages, that are directed to a called subscriber, into a language that depends on the called subscriber, wherein the system includes: a text memory in which display text for a display operator interface of the internal terminal devices are stored in several languages; subscriber-specific storage elements in which an item of selector information that identifies a language that has been selected for the subscriber terminal is respectively stored; at least one translator for translating spoken language and/or at least one translator for translating text; and a control unit for controlling a loop-in function that effectuates an insertion of a translator into a connection between the called subscriber and a calling subscriber in cases when the selector information allocated to the called subscriber is different from the selector information allocated to the calling subscriber.

Additional features and advantages of the present invention are described in, and will be apparent from, the following Detailed Description of the Preferred Embodiments and the Drawings.

Figure 2:
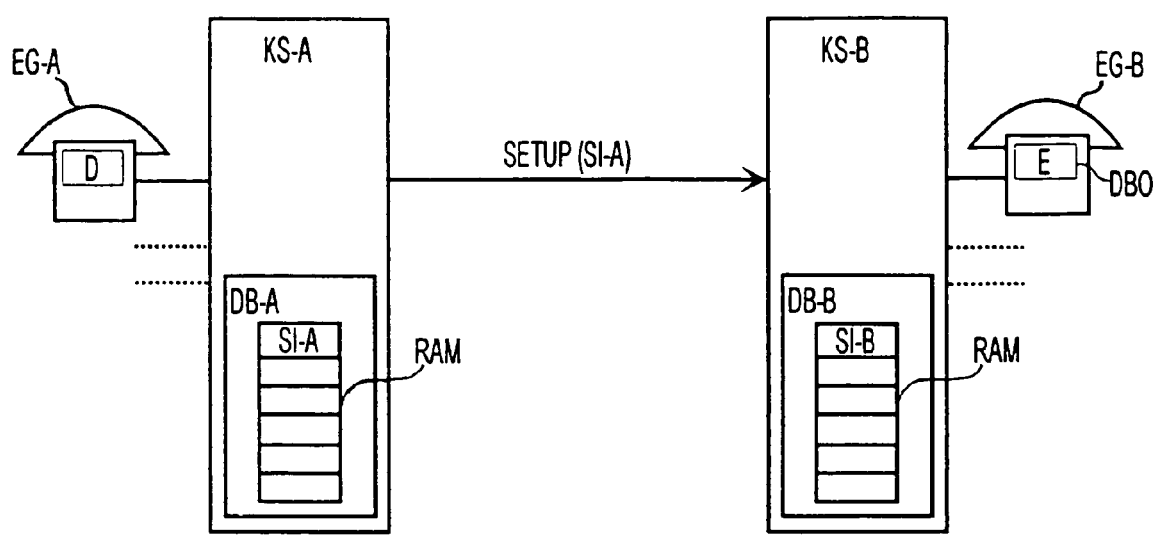

FIG. 1 shows a structural schematic diagram of a communication system for carrying out the inventive method; and FIG. 2 shows a structural schematic diagram of the functional units participating in the context of a connection set-up between subscribers also in accordance with the method of the present invention.

DETAILED DESCRIPTION OF THE PREFERRED EMBODIMENTS

FIG. 1 depicts essential functional elements of a communication system with the aid of a structural diagram. The depicted communication system consists of a system center PBX with a control unit CC which is connected to terminal units LTU1, LTU2, . . . , LTUn and to a switching matrix array SN.

The terminal units LTU1, LTU2, . . . , LTUn contain subscriber-oriented device terminals, such as ISDN base terminals for digital monofunctional and multifunctional terminal devices, 1-channel terminal modules for terminal devices such as digital voice terminal devices and network terminal devices, and subscriber terminals for analog voice terminal devices and fax terminal devices. FIG. 1 depicts an internal fax terminal device FAX1 as well as a digital voice terminal device T1 and a multifunctional terminal device M1, which respectively include a dialog operator interface DBO.

The terminal units LTU1, LTU2, . . . , LTUn contain line set circuits that serve for connecting to public and/or private networks respectively, to special equipment. These include ISDN base terminals for ISDN office traffic (office lines AL1, AL2, . . . , Aln) and ISDN cross traffic (2 channels at 64 kBit/s and ISDN signaling) as well as digital interface units; that is, multiplex terminals (30 channels at 64 kBit/s each) with the operating modes of office traffic and cross traffic with ISDN signaling, and cross traffic with channel-associated signaling.

The terminal units LTU1, LTU2, . . . , LTUn are connected to the switching matrix array SN via four voice data multiplexing channels, for example. The message exchange between the terminal units LTU1, LTU2, . . . , LTUn and the controller CC is accomplished via a signaling channel (referenced HDLC in the Figure) in the known HDLC point-to-multipoint method.

The switching matrix array SN is preferably modularly constructed and consists of a timer for 16-voice-data multiplex channels [sic] with no blocking. The connecting of two such base modules produces a coupling stage for 1024 time layers (32 multiplex channels for every 32 channels). Besides 1-channel connections, broadband connections also can be produced.

The control unit CC consists of a data processor DP, a processor for signal control DCL, a clock generator PCG and a database DB. These components are connected to one another via a system bus SB, as is illustrated in FIG. 1. The database DB contains a text memory ROM and a selector memory RAM, whereby display texts for a dialog operator interface DBO of internal terminal devices are stored in the text memory ROM in several languages. By pressing a language selection button (not illustrated) at the terminal device (FAX1, T1, M1), the dialog operator interface DBO can be switched to another available language. The language that was set at the terminal device (FAX1, T1, M1) is stored as selector information in the selector memory RAM, either temporarily until the end of the next conversation, or statically until the next language selection by the user.

A voice information server VMS and a text and fax server TFS are connected to the previously described components via a system bus SB. The voice information server VMS offers the connected subscribers the ability to reroute their telephone connection to personal "voice mailboxes". The incoming voice information is then stored in the mailboxes in digitized form and reproduced in natural language in the output. By means of the text and fax server TFS, incoming text or fax messages are filed in a person-related text or fax mailbox, such messages being outputted upon polling by the user.

Via the switching matrix array SN, voice translation devices TRSS1, . . . , TRSSn and text translation devices TRTT1, . . . , TRTTn are connected to the communication system. The translators TRTT,TRSS are connected to the system bus SB for control purposes, as illustrated in FIG. 1.

The voice translators TRSS1, . . . , TRSSn serve for translating a spoken message from a source language into a desired target language, and vice versa. For example, by means of the voice translator TRSS1, it is possible to translate a German message into an English message, and vice versa. The devices used as voice translators TRSS1, . . . , TRSSn are like those used in the European patent application 585 480, for example.

The text translators TRTT1 . . . TRTTn serve for translating a text that is written in a source language into a desired target language. By means of the text translator TRTT1, a German text can be translated into an English text. The devices used as text translators TRTT1, . . . TRTTn are like those used in the European patent application 357 370.

FIG. 2 schematically depicts a communication system KFK-A with a calling terminal device EG-A allocated thereto, on one hand, and a communication system KS-B with a called terminal device EG-B allocated thereto, on the other hand. For the sake of simplifying the description, it is assumed that both communication systems KS-A, KS-B are constructed as is described in connection with FIG. 1.

In a data base DB-A of the communication system KS-A, selector information SI is filed in a selector memory RAM, which information identifies the language that is set for a display operator interface DBO of internal terminal devices EG. Thus, for example, selector information SI-A is filed in the selector memory RAM for the illustrated calling terminal device EG-A.

In the same way, selector information SI is filed in a database DB-B of the communication system KS-B in a selector memory RAM, which information identifies the language that is set for a display operator interface DBO of internal terminal devices EG. Thus, for the illustrated called terminal device EG-B, selector information SI-B is filed in the selector memory RAM. In the depicted configuration, the language for the display operator interface DBO of the calling terminal device EG-A is German D; for the display operator interface DBO of the called terminal device EG-B, the language is English E. In a connection set-up from the calling terminal device EG-A to the called terminal device EG-B, in addition to the customary subscriber data (e.g., name of the subscriber making the call and the call number of the subscriber's station), the selector information SI-A that is allocated to the calling terminal device is transmitted to the communication system KS-B in the context of a call signaling message SETUP.

The following refers in part to FIG. 1.

With the aid of the transmitted selector information SI-A, the communication system KS_B identifies the language that is set for the calling terminal device EG-A, henceforth referred to as source language. By means of the selector information SI-B, the communication system KS-B identifies the native language that is set for the called terminal device EG-B, henceforth referred to as target langauge. If the selector information SI-A differs from the selector information SI-B, then the connection is automatically led via a translator TRSS, TRTT, which translates a message from the source language into the target language.

If the terminal devices EG-A, EG-B are a matter of digital voice terminal devices between which there is a connection for transmitting spoken messages, then a message coming in at the communication system KS-B is forwarded via the switching matrix array SN and the line c to the voice translator TRSS1, which translates the incoming message from the source language (e.g. German) into the target language (e.g. English) and transfers the translated message to the called terminal device EG-B via the line d and the switching matrix array SN. Messages that are to be subsequently transmitted from the called terminal device EG-B to the calling terminal device EG-A are forwarded via the switching matrix array SN and the line d to the voice translator TRSS1, which translates the message from English into German and transfers the translated message to the calling terminal device EG-A via the line c and the switching matrix array SN.

If the called terminal device EG-B is unavailable at the time of the connection set-up, a spoken message is stored together with the transmitted selector information SI-A in a personal voice mailbox, from which the message is outputted upon request by the receiver. The message is forwarded via the switching matrix array SN and the line c to the voice translator TRSS1, which translates the message form the source language German into the target language English and transmits the translated message to the called terminal device EG-B via the line d and the switching matrix array SN.

If the terminal devices EG-A, EG-B are fax terminal devices, for example, between which there is a data connection for transmitting fax messages, then the text portions of a fax message arriving at the communication system KS-B are converted into a text format in the source language with the aid of a character detector (optical character reading) that is known per se, which is not illustrated. The message is then forwarded via the switching matrix array and the line a to the text translator TRTT1, which translates the text from the source language German into the target language English and transfers the translated massage via the line b and the switching matrix array SN to the called terminal device EG-B.

If the called terminal device EG-B is unavailable at the time of the connection set-up, the fax message is stored in a personal fax mailbox together with the transmitted selector information SI-A. Upon polling by the receiver, the stored message is translated and transmitted to the called terminal device EG-B as described.

When the terminal devices EG-A, EG-B are multifunctional devices, for example, between which there is a data connection for transmitting electronic mail, the message that is to be translated is forwarded via the switching matrix array SN and the line a to the text translator TRTT1, which translates the message from the source language German into the target language English and transfers the translated message to the called terminal device EG-B via the line b and the switching matrix array SN. If the called terminal device EG-B is unavailable at the time of the connection set-up, an arriving message is stored in a personal text mailbox together with the transmitted selector information SI-A. Upon polling by the receiver, the stored message is translated by the text translator TRTT1 and transferred to the called terminal device EG-B as described.

The user has the option of deactivating the automatic translation. In a voice terminal device, a corresponding menu for the display operator interface DBO is offered for this purpose, in which menu the user can accept or decline the offered translation before activating the translation. For a device with a screen, this option is integrated into the monitor interface that is used in the various services (e.g., fax service).

It is provided in the context of the Present invention that the translation of a message is not performed exclusively by the communication system KS-B to which the called terminal device EG-B is allocated. If the communication system KS-B does not have at its disposal a suitable translator TRSS, TRTT which realizes a translation of a message from the source language into a desired target language, or if the translator TRSS, TRTT is not available, then the translation also can be performed by the communication system KS-A to which the calling terminal device EG-A is allocated.

Furthermore, it is possible that only calls coming in at the communication system KS-B are translated from the source language into the target language. Messages that are transferred from the called terminal device EG-B to the calling terminal device EG-A are then translated from the target language into the source language by the communication system KS-A.

It also is provided in the context of the Present invention that an automatic translation of a message is performed in the context of multimedia service changeovers, such as text-to-voice or voice-to-text.

Although the present invention has been described with reference to specific embodiments, those of skill in the art will recognize that changes may be made thereto without departing from the spirit and scope of the invention as set forth in the hereafter appended claims.

I claim:

1. A method in a communication system for translating messages that are directed to a called subscriber into a language that is dependent upon the called subscriber, the method comprising the steps of:
   storing selector information designating a language that is allocated to a relevant subscriber for internal subscribers in the communication system;
   storing display texts, in the communication system, for a dialogue operator interface of internal terminal devices in several languages;
   forming the selector information dependent on the language of the display text for the dialogue operator interface that is selected by a subscriber;
   comparing the selector information of a calling subscriber, when a connection is set up, to the selector information of the called subscriber; and
   automatically activating a loop-in function, when items of the selector information of the calling subscriber differs from the selector information of the called subscriber, which effects an insertion of a translator into the connection.

2. A method in a communication system for translating messages that are directed to a called subscriber into a language that is dependent upon the called subscriber as claimed in claim 1, the method further comprising the step of:
   transmitting, when a calling terminal device and a called terminal device are allocated to different communication systems, the selector information from the communication system of the calling terminal device to the communication system of the called terminal device.

3. A method in a communication system for translating messages that are directed to a called subscriber into a language that is dependent upon the called subscriber as claimed in claim 2, the method further comprising the step of:
   transmitting the selector information in the framework of an ISDN call signaling.

4. A method in a communication system for translating messages that are directed to a called subscriber into a language that is dependent upon the called subscriber as claimed in claim 1, the method further comprising the step of:
   transmitting, in cases when a calling terminal device and a called terminal device are allocated to different communication systems, the selector information from the communication system of the called terminal device to the communication system of the calling terminal device.

5. A method in a communication system for translating messages that are directed to a called subscriber into a language that is dependent upon the called subscriber as claimed in claim 4, the method further comprising the step of:

transmitting the selector information in the framework of an ISDN call signaling.

6. A method in a communication system for translating messages that are directed to a called subscriber into a language that is dependent upon the called subscriber as claimed in claim 1, the method further comprising the step of:

deactivating the loop-in function.

7. A method in a communication system for translating messages, that are directed to a called subscriber, into a language that is dependent upon the called subscriber as claimed in claim 1, wherein the message to be translated is at least one of a voice message, a fax message, a video message and a message for electronic mail.

8. A system in a communication system for translating messages, that are directed to a called subscriber, into a language that depends on the called subscriber, the system comprising:

a text memory in which display text for a display operator interface of internal terminal devices are stored in several languages;

subscriber-specific storage elements in which an item of selector information that identifies a language that has been selected for the subscriber terminal is respectively stored;

at least one translator for translating at least one of spoken language and text; and a control unit for controlling a loop-in function that effects an insertion of a translator into a connection between the called subscriber and a calling subscriber in cases when the selector information allocated to the called subscriber is different from the selector information allocated to the calling subscriber.

* * * * *